(No Model.) 4 Sheets—Sheet 4.
O. B. PECK.
CENTRIFUGAL ORE SEPARATOR.
No. 489,204. Patented Jan. 3, 1893.
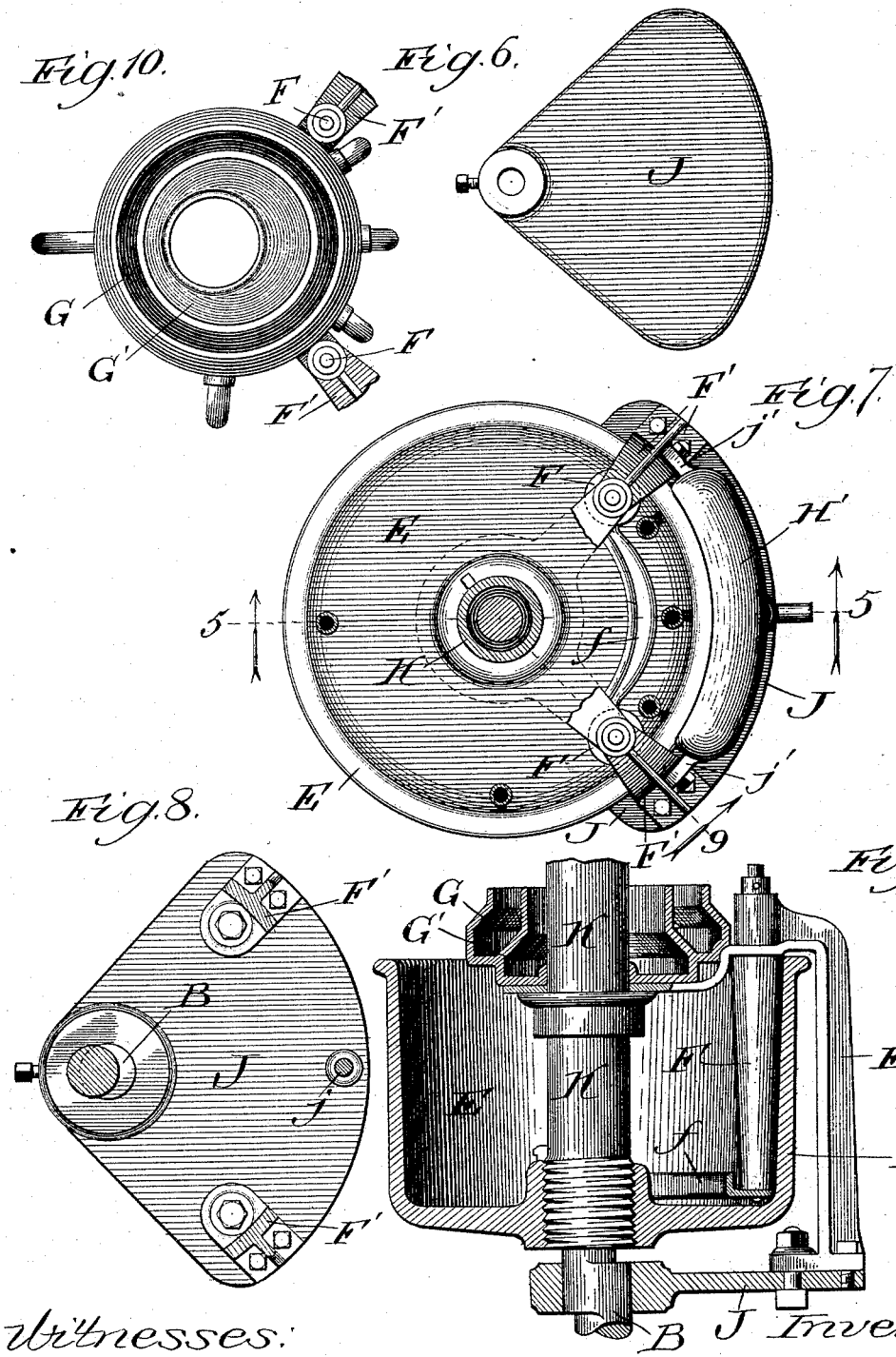

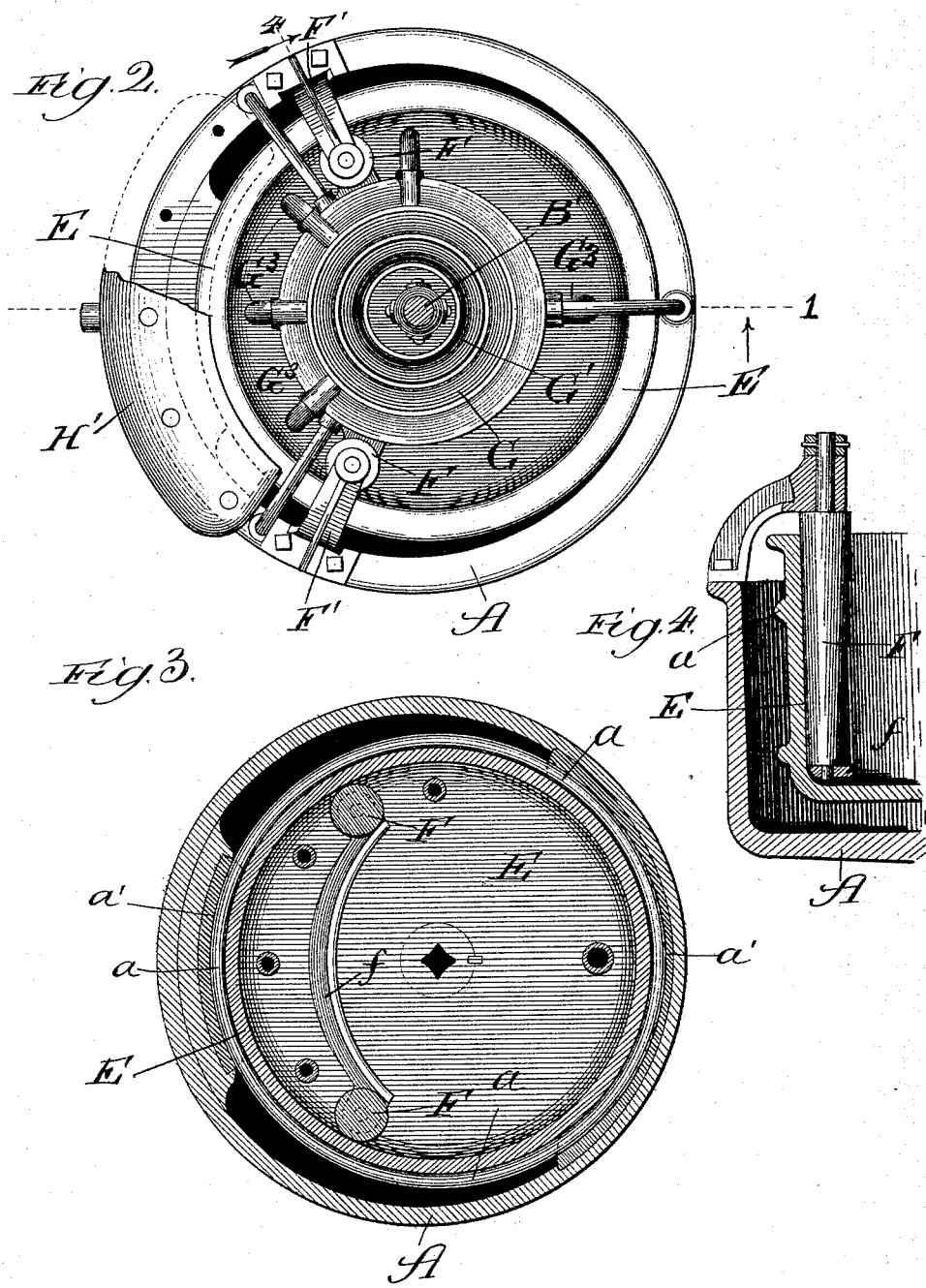

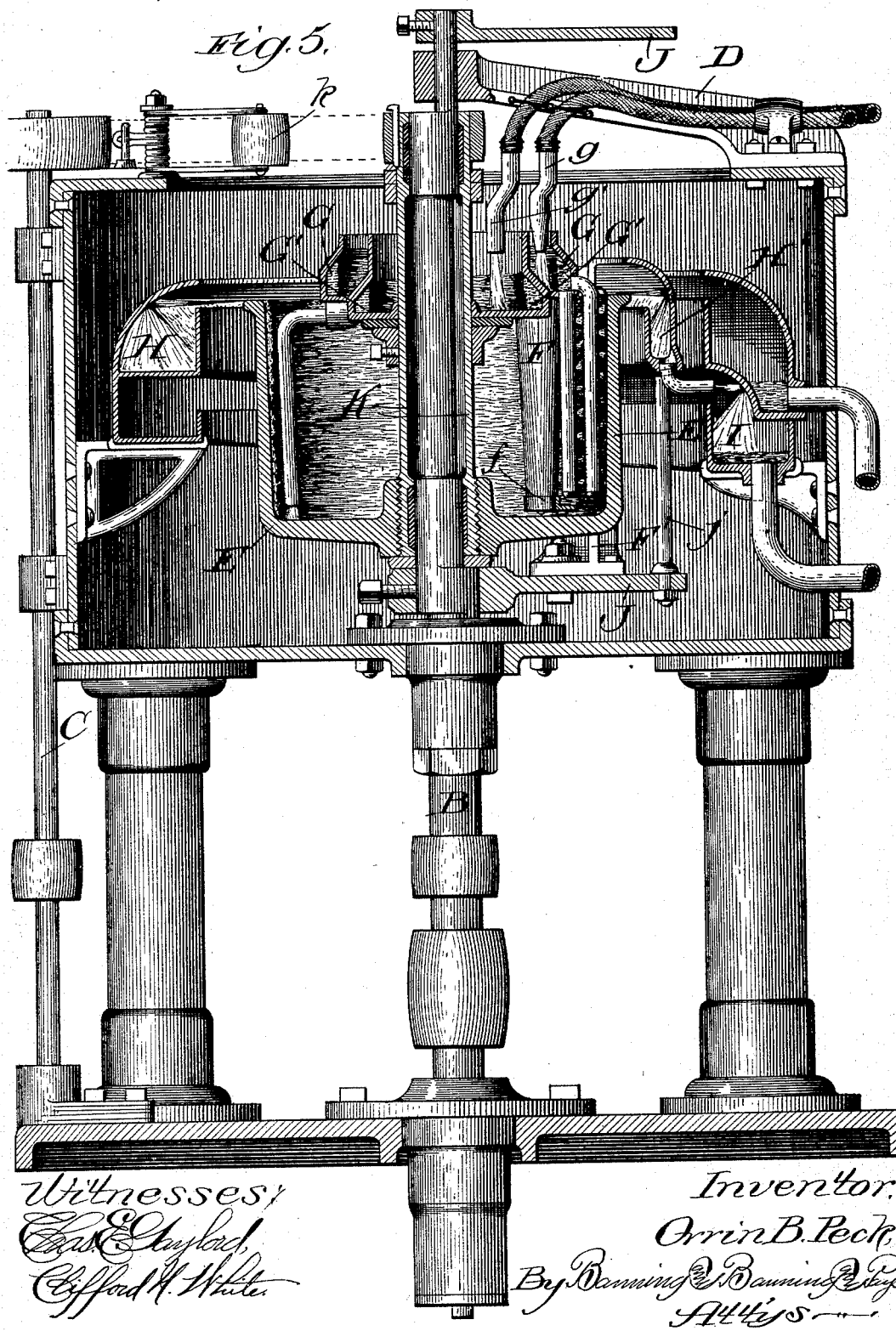

UNITED STATES PATENT OFFICE.

ORRIN B. PECK, OF CHICAGO, ILLINOIS, ASSIGNOR TO MELINDA PECK, OF SAME PLACE.

CENTRIFUGAL ORE-SEPARATOR.

SPECIFICATION forming part of Letters Patent No. 489,204, dated January 3, 1893.

Application filed January 11, 1892. Serial No. 417,691. (No model.)

*To all whom it may concern:*

Be it known that I, ORRIN B. PECK, a citizen of the United States, residing at Chicago, Illinois, have invented certain new and useful Improvements in Centrifugal Ore-Separators, of which the following is a specification.

In the drawings Figure 1 is a vertical section of my improved apparatus; Fig. 2 is a plan view of the revoluble treatment vessel, and its parts, with a portion of a receptacle H', hereinafter described. Fig. 3 is a plan view of a section taken in line 3 of Fig. 1, looking in the direction of the arrows; Fig. 4 is a vertical section taken in the line 4 of Fig. 2, looking in the direction of the arrow; Fig. 5 is a vertical section of a modified form of apparatus, showing the treatment vessel taken on the line 5 of Fig. 7; Fig. 6 is a plan view of a counter weight or balance hereinafter described; Fig. 7 is a plan view of the treatment vessel shown in Fig. 5; Fig. 8 is a plan view of a balance or counter-weight hereinafter described; Fig. 9 is a vertical section of the treatment vessel taken in the line 9 of Fig. 7, looking in the direction of the arrow, and Fig. 10 is a plan view of the receiving bowl shown in Fig. 5.

In making my improved apparatus for separating powdered or finely divided particles containing mineral bearing substances of different degrees of specific gravity, I make a vessel A mounted upon and rotated by a shaft B, supported and rotated in any suitable manner. Preferably at the side of the apparatus I arrange a countershaft C, which may be rotated by means of belts and pulleys connecting it with the shaft B. At the top of the apparatus I arrange a bracket D, providing a bearing for a rotatable shaft B'. This shaft may be connected by a belt with a countershaft, so as to have rotation imparted to it. Within the rotatable vessel A is arranged a treatment vessel E, which is fixed to the shaft B', so as to be rotatable about it. Around the inner walls of the rotatable vessel A are arranged suitable bearings $a$, provided with a groove or channel in which flanges or beds $a'$ on the vessel E are arranged, so that such vessel is held and maintained in the desired position. The bearings $a$ are arranged at a greater distance from the wall at one side of the vessel A than at the other, so that the treatment vessel E, when in position, has its center eccentric to the center of the vessel A and the shaft B. Within the treatment vessel I arrange one or more rollers F, held by suitable brackets F' near the wall of the treatment vessel, so that the surface of the roller will be in rolling or frictional contact with the inner wall of the treatment vessel. Arranged around the shaft B, but independent of it, in suitable position, and supported by brackets on the rotatable vessel A, is a receiving bowl divided into compartments G and G', into which a material supply pipe $g$ and a water supply pipe $g'$ respectively introduce material and water in the operation of the apparatus. The material from the compartment G' is carried down a pipe $G^2$ and deposited in the treatment vessel near its bottom, while the water from the compartment G is carried down one or more spray pipes $G^3$ and discharged against the wall of the treatment vessel. As the material is deposited in the treatment vessel it is driven by the action of centrifugal force against the side of the treatment vessel farthest from the common center of rotation. The lighter particles are driven up the side and over the top of the treatment vessel at the side farthest from the common center of rotation and deposited in a suitable curbing or receptacle H, whence they may be carried off. The heavier particles adhering to the wall of the treatment vessel are carried around by its independent rotation, past the roller, and between it and the wall of the treatment vessel. As the heavier particles pass the roller F, the sprays of water from the water pipes which are located at this part of the treatment vessel assist in detaching and driving them up the wall of the treatment vessel and over into a receptacle H' adapted to receive them. This receptacle is mounted on the rotatable vessel A, and is carried around with it so as always to be at that part of the treatment vessel where the heavier particles are discharged. From this receptacle the heavier particles pass into another receptacle or curbing I, so that they may be carried to the desired place of deposit.

From the description thus far it will be seen that the treatment vessel E has a capacity for independent rotation through means of the shaft B', in addition to being carried around by the rotation of the shaft A, and that in its rotation its center of independent rotation is eccentric to, or somewhat at the side, of the general center of rotation represented by the shaft B. By this arrangement I effect a separation and discharge of the lighter particles of the material being treated at the side of the treatment vessel farthest from the common center of rotation, and the discharge of the heavier particles at the side of the vessel nearest to the common center of rotation. In this way, the operation of separating and discharging the lighter from the heavier particles of the material treated, and removing the heavier particles may be carried on continuously and simultaneously. In the drawings I have shown two rollers F, with a plate or bracket $f$ at the bottom, holding their lower ends a proper distance apart.

In the last two sheets of the drawings I have shown a modified form of apparatus. In the modified apparatus I dispense with the rotatable vessel A, but rotate the treatment vessel E on an eccentric from the common center of rotation, as in the apparatus already described. To maintain the equilibrium of the treatment vessel I mount on the shaft B' counterbalances or weights J, of a proper size and weight to secure the steady rotation of the treatment vessel. To support the receptacle H', and cause it to be rotated, I support it on the lower counterbalances by means of one or more rods or posts $j$, as shown in Fig. 5. This receptacle may be further supported by ears or lugs $j'$, from the top, as shown in Fig. 7, where they are bolted to the brackets supporting the upper ends of the rollers F. As the treatment vessel, in its rotations, is constantly carried from one side to the other, owing to the fact that its shaft is arranged eccentrically to the shaft B, the belt by which it is independently revolved, through the pulley and hollow sleeve K, from the countershaft C, will alternately be loosened and tightened. To preserve the proper tension of this belt I arrange a spring belt tightener $k$, shown in Fig. 5. In the modified form of apparatus, as particularly shown in Fig. 9, the receiving bowl is supported on the brackets F' extending up from the lower counterbalance, instead of on a rotatable vessel A, as in the first form of apparatus.

The operation of the modified form of apparatus is the same as that already described, and need not be repeated.

What I regard as new and desire to secure by this application, is:—

In centrifugal ore separators, the combination of a treatment vessel rotatable on an axis eccentric to the main axis of rotation, one or more rollers arranged within the vessel rotatable in frictional or rolling contact with its inner wall, and means for rotating the vessel, substantially as described.

ORRIN B. PECK.

Witnesses:
THOMAS A. BANNING,
MARIE L. PRICE.